(12) United States Patent
Jennings

(10) Patent No.: US 6,886,591 B2
(45) Date of Patent: May 3, 2005

(54) SENSITIVE FLUID BALANCING RELIEF VALVE

(76) Inventor: Jeffery D. Jennings, 29 Thistlewood La., Hendersonville, NC (US) 28791

( * ) Notice: Subject to any disclaimer, the term of this patent is extended or adjusted under 35 U.S.C. 154(b) by 143 days.

(21) Appl. No.: 10/122,673

(22) Filed: Apr. 15, 2002

(65) Prior Publication Data

US 2003/0192589 A1 Oct. 16, 2003

(51) Int. Cl.⁷ ............................................... F16K 17/02
(52) U.S. Cl. ................................... 137/510; 137/512.15
(58) Field of Search ................................ 137/87.01, 94, 137/510, 512.15

(56) References Cited

U.S. PATENT DOCUMENTS

| | | | |
|---|---|---|---|
| 4,679,421 A | * 7/1987 | Barree | 73/38 |
| 4,712,580 A | * 12/1987 | Gilman et al. | 137/512.15 |
| 4,981,157 A | * 1/1991 | Denkinger | 137/510 |
| 5,265,645 A | * 11/1993 | Goodwin | 137/512.15 |
| 5,944,050 A | * 8/1999 | Walker | 137/510 |
| 6,095,183 A | 8/2000 | Taylor et al. | 137/475 |
| 6,318,406 B1 | 11/2001 | Conley | 137/491 |

* cited by examiner

Primary Examiner—Stephen M. Hepperle
(74) Attorney, Agent, or Firm—Joseph T. Guy; Nexsen Pruet, LLC

(57) ABSTRACT

A relief valve comprising a diaphragm for control of process pressure is provided. The diaphragm has a fluid pressure on a first side and a process pressure on a second side. The second side is engagable with a process void and at least one vent void such that when the process pressure is below the fluid pressure the diaphragm is engaged with the vent void. When the process pressure is above the fluid pressure the diaphragm is not engaged with the vent void.

16 Claims, 3 Drawing Sheets

SENSITIVE FLUID BALANCING RELIEF VALVE

FIELD OF THE INVENTION

The present invention relates to a new and improved modulated pressure relief valve which balances vessel or line pressure against a reference pressure signal.

BACKGROUND

There has been a long felt desire for a modulated pressure relief valve on a vessel for venting fluid when the pressure exceeds a desired dynamic set-point or threshold. A particular desire is for a modulated pressure relief valve with a threshold that could vary according to process requirements and its upper limit could serve to avoid blowing a safety relief device such as an expendable rupture disc or pop-off safety relief valve both of which are typically designed for infrequent use. It is desirable to communicate the desired pressure set-point to the relief valve via a reference pressure signal (typically air) that is equal to the desired vessel pressure.

Furthermore, it is desirable to have a modulating pressure relief valve which is very simple, with cleanable parts and with no narrow passageways that can become plugged with debris or frozen product. Such a device would be useful in many applications including the food, beverage, gelatin, and polymer industries, where the product can become frozen in critical passages, and where all crevices must be exposed to the rinsing and cleaning processes.

Typical safety relief valves, such as those exemplified in U.S. Pat. No. 6,095,183, include a valve member biased by a spring into engagement with a seat. If product pressure exceeds a predetermined level, the force against the valve exceeds the biasing force of the spring causing the valve to lift from the seat to vent product pressure.

Typical diaphragm relief valves, such as those exemplified in U.S. Pat. No. 5,944,050, do present simple, cleanable surfaces yet they clearly do not meet the dynamic set-point requirement desired in the art. Furthermore, the inaccuracies of the spring compression typically result in wide variations in relieving pressures, often greater than 10%, and the variations change over time.

Dynamically modulated relief valves are provided that use a reference or pilot signal as exemplified in. U.S. Pat. No. 6,318,406. These typically involve complex spring and seal mechanisms. Besides the inherent robustness issues with the complex mechanisms, they are clearly not acceptable for use in processes with debris, freezeable product, or requiring cleanability.

Typical relief valves are quite insensitive to slight differences in pressure, and typically have large cracking pressure biases. A highly sensitive relief valve would help maintain a constant vessel pressure during changes in the upstream process environment which is a feature that is very useful in many industrial steady-state applications, including constant-flow applications.

Further, there has been a long felt desire for a relief valve that could balance vessel pressure exactly to a reference, or pilot, pressure. This would facilitate a complete vessel pressure control system when used in conjunction with a simple instrument pressure sender and a, preferably no-loss, check valve.

Typically available pilot actuated relief valves cannot control vessel pressure to the exact pressure of the reference signal.

SUMMARY OF THE INVENTION

It is an object of the invention to provide a pressure relief device which is simple and cleanable, making it useful in a variety of process applications where debris, freezeable product, or sanitary requirements prohibit recesses or crevices.

A further objective of the invention is the ability to control vessel pressure via a remote pressure reference signal, such as commonly used in industrial control systems.

Particular features of the relief device include, simplicity and cleanability, response to remote reference signal and high sensitivity to slight differences between the reference pressure and process pressure to achieve complete balance between vessel and reference pressure.

A further objective of the invention is to perfectly balance vessel pressure with the reference pressure, so as to facilitate a completely automated vessel pressure control system, both filling and relieving, by adding only a pressure sending device isolated from the process by a check valve.

In a preferred embodiment vessel pressure is generated in a forward direction by a pressure sender through a check valve while all reductions in vessel pressure are conducted by a modulating pressure relief valve with reference pressure communicated directly from a pressure sender.

Yet another objective of the invention is to provide a device with high pressure sensitivity, while preventing the unnecessary venting of process fluids. This invention is imminently suitable for protecting sensitive instrumentation from moisture, foam or debris from the vessel venting process.

The present invention is a floating diaphragm relief device which balances vessel, or line pressure, against a reference pressure signal. A simple flexible diaphragm constrained on its periphery, separates the reference fluid chamber on one side from a specific seating surface on the other side. This seating surface contains a connection to both the vessel, line or upstream process and vent or downstream environment. The seating surface preferably contains one or more vent holes of varying, but defined, sizes, which, when the diaphragm is not fully seated against them, can communicate from the vessel or line to the vent or lower pressure environment.

A particularly preferred embodiment is provided in a relief valve comprising a diaphragm. The diaphragm has a fluid pressure on a first side and a process pressure on a second side. The second side is engagable with a process void and at least one vent void such that when the process pressure is at or below the fluid pressure the diaphragm is engaged with the vent void. When the process pressure is above the fluid pressure the diaphragm is not engaged with the vent void.

Another preferred embodiment is provided in a relief valve. The relief valve comprises a process housing which comprises a process void and at least one vent void. The process void is in pressure communication with a process system, with a process pressure. The vent void selectively allows material to flow from the process system through the vent void. A reference housing is provided wherein the reference housing contains a fluid at a predetermined pressure. A diaphragm is between the process housing and the reference housing and capable of engaging with the vent void and the process void. When the reference pressure is equal or higher than the process pressure the diaphragm is engaged with the vent void. When the process pressure is higher than the reference pressure the diaphragm is not engaged with the vent void and the process pressure can decrease through the vent void.

Another particularly preferred embodiment is provided in a relief valve. The relief valve comprises a diaphragm between a reference housing and a process housing. The process housing comprises a process void, in pressure communication with a process vessel at a process pressure, and a vent void. The reference housing comprises a fluid at a reference pressure. When the reference pressure equals or exceeds the process pressure the diaphragm is engaged with the vent void and when the process pressure exceeds the reference pressure the diaphragm is not engaged with the vent void and the process pressure decreases by venting through the vent void.

DETAILED DESCRIPTION

Figure 1:
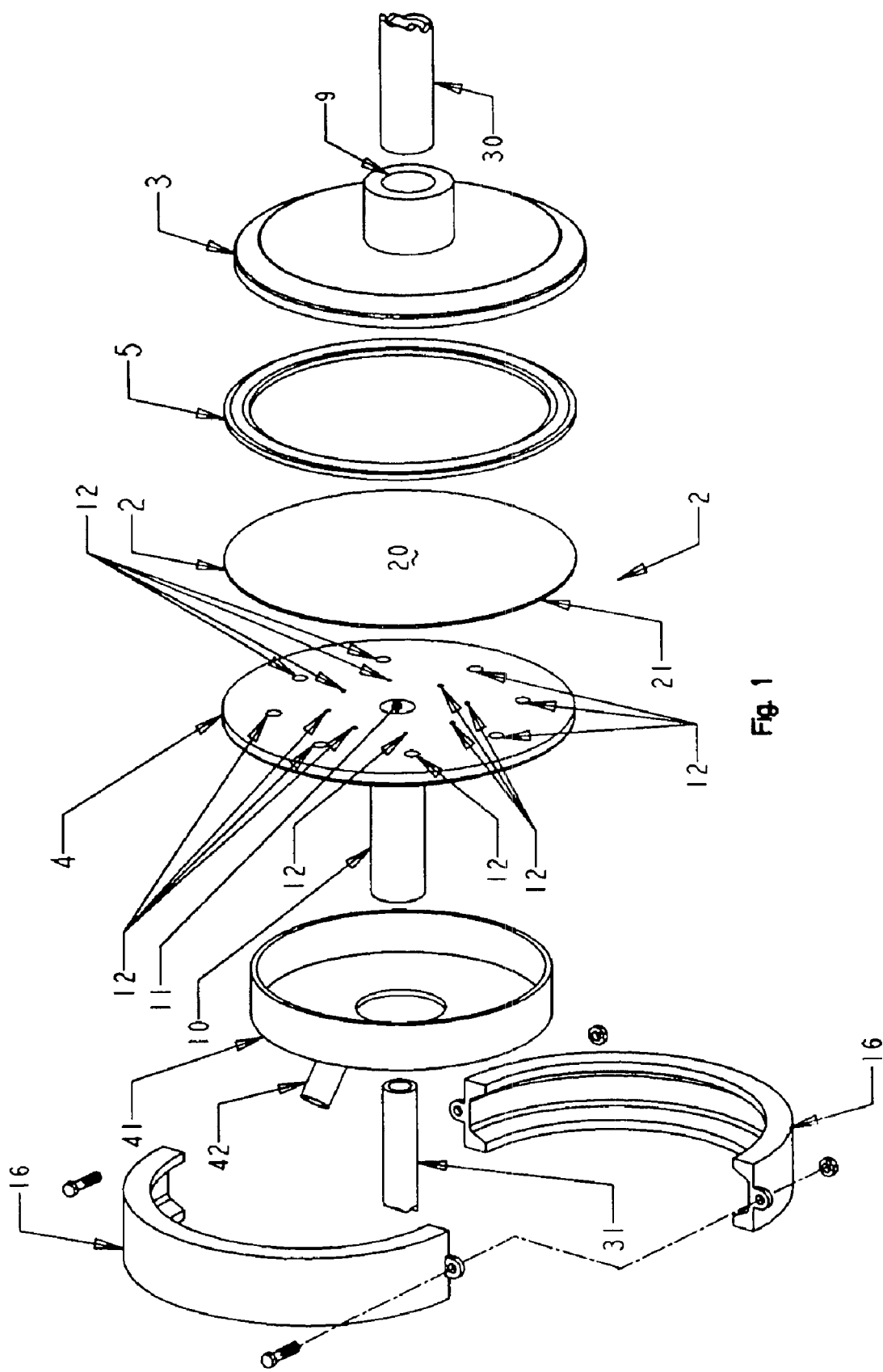
FIG. 1 is an exploded perspective view of an embodiment of the present invention.

The invention is described with reference to the drawings. The drawings are provided to facilitate discussion of the invention and are not intended to limit the invention in any way. In the drawings all similar elements are numbered accordingly.

An embodiment of the present invention is provided in FIG. 1. In FIG. 1, the modulated pressure relief valve, generally represented at 1, is shown in exploded perspective view. The modulated pressure relief valve, 1, comprises a diaphragm, 2, which is enclosed between an reference housing, 3, and a process housing, 4. The diaphragm, 2, comprises a reference surface, 20, and a process surface, 21, which is opposite the reference surface. For the purposes of the present application the volume between the reference surface of the diaphragm and reference housing is referred to as the reference volume and the area between the process surface of the diaphragm and the process housing is referred to as the process volume. An optional seal, 5, can be employed between the diaphragm and reference housing, between the diaphragm and process housing, or both to insure that the entire assembly is sealed relative to operating pressure ranges which are anticipated.

The reference housing, 3, comprising a reference coupling, 9, which engages with a reference pressure source, 30. The reference coupling, 9, can be any coupling typically employed for connecting a fluid source to a device. Threaded couplings, compression couplings, ferreted couplings, soldered couplings, welded couplings, barbed couplings attached to flexible tubing and the like are imminently suitable for the demonstration of the invention. It would be well within the ability of one skilled in the art to attach a pressure system to a coupling and further description herein is not warranted.

The process housing, 4, comprises a process coupling, 10, which attaches to a process system, 31, within which the pressure is to be maintained. The process coupling, 10, can be any coupling typically employed for connecting a pressure regulator, or pressure release to a process vessel or line. Threaded couplings, compression couplings, ferreled couplings, soldered couplings, welded couplings, barbed couplings attached to flexible tubing and the like are imminently suitable for the demonstration of the invention. It would be well within the ability of one skilled in the art to attach a process system to a coupling and further description herein is not warranted.

The process housing, 4, comprises a process void, 11, which is in pressure communication with the process vessel such that the pressure at the process void is proportional to the pressure in the process vessel. In a particularly preferred embodiment the pressure at the process void is approximately equal to the pressure in the process vessel. In another embodiment the pressure at the process void is proportional to the pressure in the process vessel as would be realized when pressure reduction devices are utilized between the process vessel and modulated pressure relief valve as known in the art. At least one vent void, 12, is provided in the process housing, 4. The vent void, 12, is in flow communication with the environment exterior to the process vessel. As will be more fully understood from further descriptions when the pressure exerted on the reference surface of the diaphragm exceeds the pressure on the process surface of the diaphragm at the process vent, 11, the process void and vent voids are engaged by the diaphragm thereby sealing the vent void and prohibiting material, or the pressure created by material, from passing through the vent void. When the pressure in the process void, 11, is sufficient to dislodge the diaphragm from sealing engagement with the process void the diaphragm is persuaded towards the reference housing thereby disengaging the diaphragm from at least one vent void thereby forming a flow channel from the process void to the vent void whereby the pressure is released through the vent void.

Figure 2:
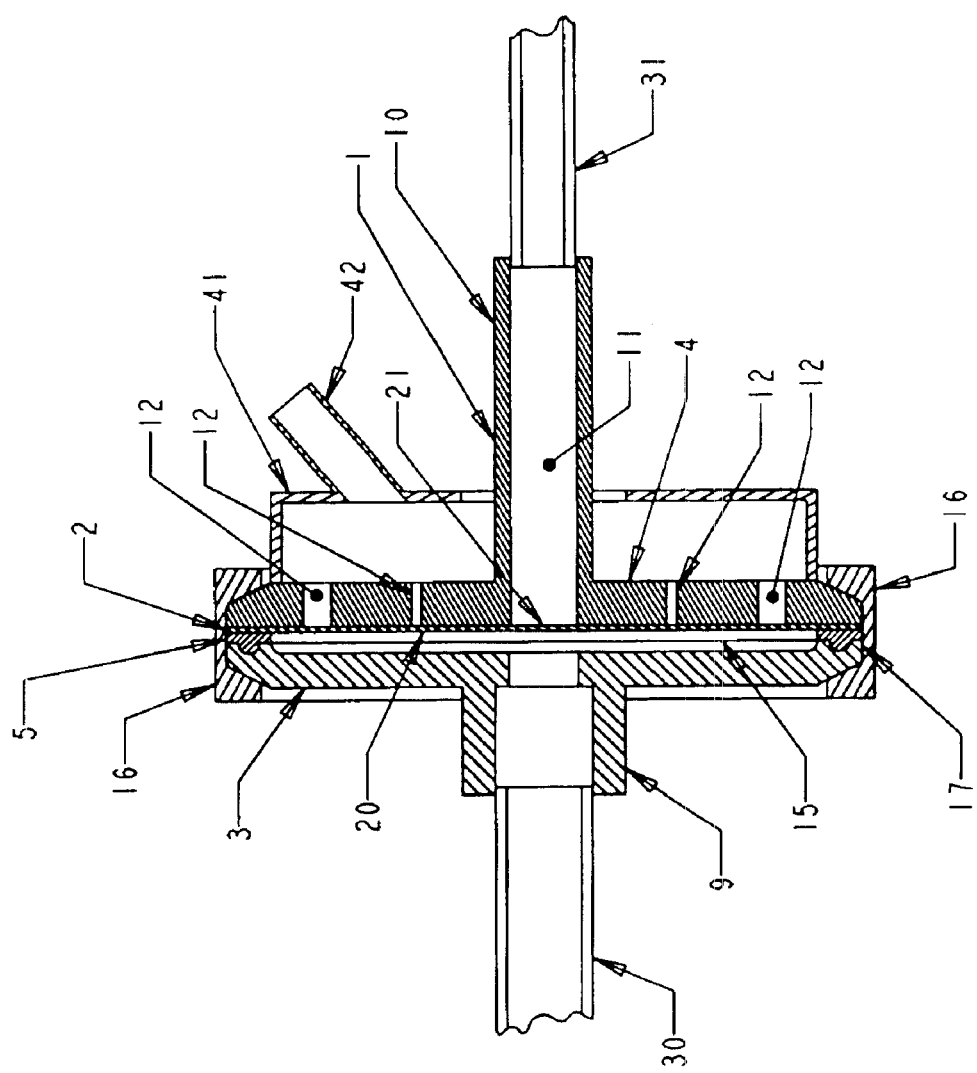
FIG. 2 is a cross-sectional view of an embodiment of the present invention.

A cross-sectional view of the modulated pressure relief valve is shown in FIG. 2 as it would appear when the pressure on the reference surface, 20, of the diaphragm, 2, exceeds the pressure on the process surface, 21, of the diaphragm. In this condition the reference volume, 15, is maximized and the process volume is essentially non-existent. As the pressure exerted on the area of the process surface, 21, increases due to an increase in pressure in the process coupling, 10, the diaphragm is persuaded away from the process housing thereby distorting the diaphragm. If the pressure on the process surface, 21, increases the process volume enlarges at the expense of the reference volume. As the process volume increases the diaphragm continues to be distorted until the diaphragm disengages with at least one vent void, 12, at which point the pressure is released through the vent void thereby allowing pressure to lower until the pressure is reduced to a pressure equal to the pressure in the reference volume at which point the process volume decreases and the diaphragm reengages with the vent void. It would be apparent from the description that the higher the pressure difference between the vessel and the reference coupling the more distorted the diaphragm becomes and therefore the diaphragm disengages with more vent voids.

An optional vent hood, 41, is provided whereby all material transiting through the vent void is captured and collected through a vent port, 42. It would be readily apparent that each vent void may have a separate vent port attached thereto. The vent ports allow the vented material to captured and released as appropriate.

A clamping mechanism, 16, with a receiving inset, 17, is provided in FIG. 2 wherein the modulated pressure relief valve is received in the inset, 17, to maintain the reference housing and process housing in sandwiched relationship with the diaphragm there between. The clamping mechanism could be a clamp, matching tabs, pliable ring seal or any mechanism capable of maintaining the modulated pressure relief valve in sandwiched relationship. It is well within the ability of one skilled in the art to utilize clamping mechanisms suitable for the application which would maintain the modulated pressure relief valve in the appropriate sandwiched relationship.

Figure 3:
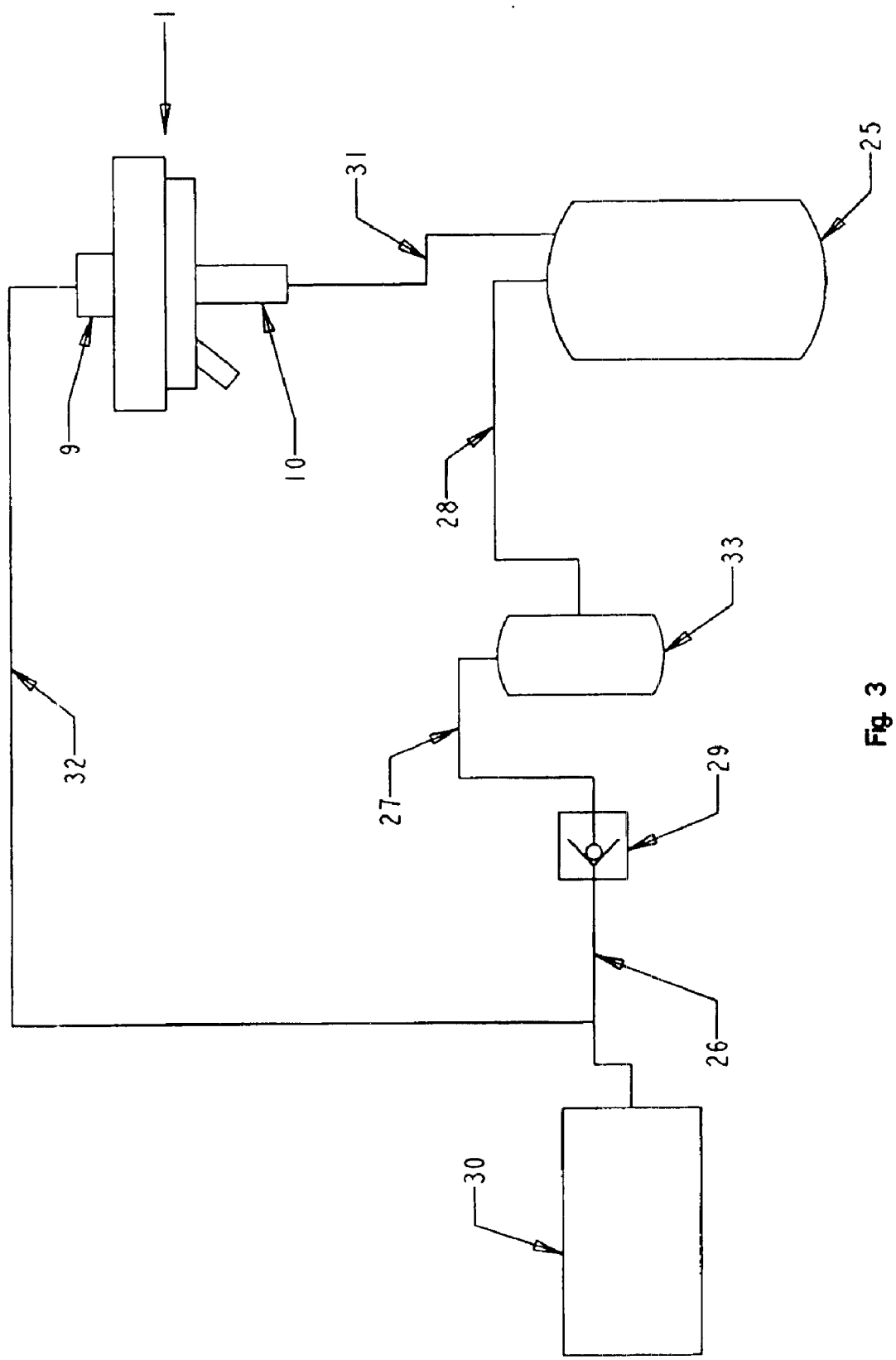
FIG. 3 is a schematic representation of a system incorporating the present invention.

A schematic representation of a process system incorporating the modulated pressure relief valve is provided in FIG. 3. In FIG. 3, the modulated pressure relief valve, 1, is integral to a pressure control system which includes a process vessel, 25, and pressure reference source, 30. The process vessel, 25, is connected to the process coupling, 10, of the modulated pressure relief valve, 1, by a process line, 31, as would be readily understood to one of ordinary skill in the art. The reference coupling, 9, of the modulated pressure relief valve, 1, is connected to the reference pressure source, 30, by a process line, 32, as would be readily understood to one of ordinary skill in the art to form a control loop. An optional, but preferred, feed back loop, comprising a check valve, 29, and optional separator, 33, provides optimal control of the pressure within the process vessel. The check valve, 29, is preferably a one-way flow valve allowing flow towards the direction of the process vessel but not counter thereto. The process vessel, 25, separator, 33, check valve, 29, and reference pressure source, 30, are connected, preferably in series, by process lines, 28, 27, and 26 respectively. The pressure in the process vessel is maintained by venting through the modulated pressure relief valve, 1, or by replenishment through the check valve, 29. The system allows for accurate, rapid pressure control in the process vessel. By way of example, if the operator desires to increase the pressure in the process vessel the pressure from the reference pressure source is increased. The pressure above the diaphragm would then be increased and the air (or other fluid) would flow through the check valve. Once the pressure in the process vessel equals the pressure supplied by the reference pressure source the check valve and modulated pressure relief valve are both closed thereby the system pressure is neutral. It would be apparent that, in typical manufacturing configurations, there is a possible pressure drop in the lines leading to the vessel. This pressure drop may be more than the corresponding pressure drop in the lines leading to the modulated pressure relief valve. This is advantageous for the present invention but not required. If the operator desires to lower the pressure in the process vessel the pressure supplied by the reference pressure source is decreased. The pressure exerted on the diaphragm will then be lower on the reference face of the diaphragm and the process pressure will be allowed to vent until the pressure on each side of the diaphragm is rebalanced.

It is well known in the art that many control systems, particularly flow based control systems, do not adjust to a given level but instead typically go beyond the intended control level and then correct. This oscillatory approach is mitigated by the present invention which represents a particular advantage. Due to the ability of the modulated pressure relief valve to rapidly vent a system, as illustrated in FIG. 3, it balances the pressure introduction sufficiently to minimize the build up of pressure above the desired pressure.

The knowledge provided herein and understanding related to selection and location of the diaphragm, in conjunction with the placement, size, and shape of the vent voids, give the device a characterized performance curve. In practice, the valve can modulate between the closed state and cracked state, wherein venting occurs, with pressure differentials below ¼ psi.

A diaphragm is situated across a surface containing both the process void, from vessel or line, and a variety of smaller vent voids. On the reference surface of the diaphragm, the pressure reference fluid, preferably air, provides balancing forces. The sensitivity of the device is provided by the size of the vent voids from which the diaphragm is easily dislodged by low pressure differences. Greater relief volume is provided by progressively larger vent voids. The distance between the diaphragm and the interior surface of the reference housing, which determines the reference volume, is a critical parameter in predicting and controlling the sensitivity of the device.

The characteristics of the diaphragm are integral to the performance of the device. Excellent sensitivity has been achieved with a flexible diaphragm with reinforcement fibers to prevent excessive stretching.

There are three fluid pressures acting on the diaphragm, process pressure, vent pressure, and reference pressure. The diaphragm serves to balance the process pressure and reference pressure.

During normal balanced or modulating mode the diaphragm is drawn into a sealing relationship with the vent voids due to the pressure differential between the vent pressure and reference pressure. When the vessel pressure exceeds the reference pressure the area of the diaphragm between the vent voids is persuaded away from the outlet holes thereby allowing venting. This motion, however, is limited by the inner surface of the reference housing. The diaphragm is forced into an irregular pattern, with regions closely surrounding the vent voids being unsupported by the interior surface of the reference housing, and therefore trying to pull the diaphragm out of contact with the outlet hole. At the smallest holes, the ratio of unsupported diaphragm area to outlet hole area can be very high, such as 400:1 for example. When the ratio of pressure differential ratio, which is defined as the differential Vessel-Reference divided by Reference-Vent, rises to the area ratio, which is defined by the unsupported diaphragm area divided by the area of the vent void, then that particular vent void begins to crack open or modulate. The valve preferably opens up the smaller vent voids first, and gradually progresses to the larger vent voids. At higher differential pressures, such as several psi, the entire hole pattern opens up to allow higher venting volumes.

The selection of hole size and spacing controls the relieving capacity and the sensitivity of the device. The desired combination of high relieving capacity and high sensitivity can be achieved by combining both small holes and large holes in the same device. The smaller the size of the smallest vent voids, the greater the sensitivity of the device. In one embodiment a device with a minimum vent void diameter of 0.042", would yield a cracking sensitivity of approximately ¼ psi. Smaller vent voids would be expected to provide more sensitivity. In one embodiment the vent void is a frit with multiple flow paths through a given vent void. The vent voids are preferably large enough to avoid pluggage by contaminants in the fluid stream, and small enough to provide the required cracking sensitivity.

The number of small vent voids determines the relieving capacity of the device in the lower pressure differential range. While one very small vent void would provide a sensitive device that cracks at very low pressure differentials, it might not produce the needed effect on the system because the relieving volume of that hole might not be enough to control the system pressure. Therefore, a number of small vent voids may be provided such that the sum of their cross sectional area relates, proportionally, to the expected required relieving capacity. A vent void housing comprising 8 small holes, symmetrically arranged, is suitable for demonstration of the present invention.

Larger vent voids contribute to higher relieving capacity at the higher differential pressures. The ultimate relief capacity will be proportional to the sum total of all vent void cross sectional areas. Depending on the overall space available, a large hole size should be selected which provides enough capacity per hole for the process conditions without being so large as to have inadequate sensitivity. The diameter of the larger holes determines the differential pressures at which the higher relief flows can occur. Large vent voids of approximately 0.15" diameter, would be expected to begin cracking open in the 2–5 psi range.

The minimum and maximum vent void sizes are based on the desired sensitivity of the valve in the low and high flow regimes and the contaminant characteristics of the fluid. Intermediate vent void sizes may be selected to assure good relieving capacity in the medium differential pressure range. The number of vent voids should be selected to achieve the desired maximum flow capacity. The full open flow of the valve can be approximated by analyzing the parallel transmittance provided by the parallel outlet vent voids. Diaphragm size, typically defined by the diameter, is preferably selected to allow for a reasonable spacing ratio between vent voids which is based, in part, on diaphragm movement gap or the maximum distance between the reference surface and interior of the reference housing.

The size of the process void is not a critical design parameter, but is preferably sized so that both the cross sectional area of the process void, and the cylindrical opening area between the process void and the retracted diaphragm (periphery multiplied by diaphragm movement gap) are both significantly larger than the sum total cross sectional area of all the vent voids.

The diaphragm movement gap, or the maximum distance between the reference surface, 20, and the reference housing, is a critical parameter. It affects the valve sensitivity and affects the optimum spacing of the vent void. The gap is preferably great enough that the cylindrical opening area (defined above), when the diaphragm is fully retracted against the reference housing is larger than the sum total of the vent voids. A total diaphragm movement gap of 0.1 inch is suitable for demonstration of the invention.

Each vent void must have an adequate free area around it so that the diaphragm can form a dimple shaped unsupported area. The size of this spacing is not related to the vent void size, but rather the gap distance that the diaphragm can move (distance between seat surface to reference housing surface). Increased vent void spacing tends to increase sensitivity up to a threshold ratio, and has less impact above that threshold ratio. This threshold ratio is dependant on diaphragm stiffness. A minimum hole spacing of 0.4 inches is adequate for demonstration of the present invention. The diaphragm movement gap of approximately 0.1 inch results in a vent void spacing to movement gap ratio of approximately 4:1.

The location of the vent voids is not a critical design parameter, assuming adequate spacing is provided. However, it is recommended that the smaller vent voids be located closer to the process void.

Another variable in the performance of the valve is the location of the diaphragm's peripheral constraint relative to the gap between the process surface and the reference surface. Offset of the diaphragm constraint in the direction of the reference surface tends to bias the valve to relieve at lower, or even negative differential pressures, which can result in a unnecessary flow or waste of fluid. Good balanced performance, with negligible waste flow, can be achieved in the tested design by constraining the diaphragm directly along the process surface. The offset can be used to create a pressure bias. The modulated pressure relief valve can be configured utilizing shaped surfaces, such as concave or convex, on the diaphragm, process housing or both. Ribbing in the diaphragm, or process housing, can also be effectively utilized to alter the pressure bias between the process pressure and reference pressure at which venting occurs. If the modulated pressure relief valve is configured with an offset, for example, wherein the diaphragm is away from the process surface, for example, a positive pressure bias can be created wherein the modulated pressure relief valve vents at a process pressure which is lower than the reference pressure. This is also referred to in the art as an opening bias. Alternatively, the modulated pressure relief valve can be configured such that a negative pressure bias is created wherein the process pressure must be higher than the reference pressure prior to venting. This would be referred to in the art as a closing bias.

The overall size of the diaphragm area ultimately determines the maximum possible relieving capacity. Increasing the overall size of the diaphragm area provides for greater potential relieving capacity, and can, when carefully combined with vent void size, spacing, and movement gap selection, offer greater pressure sensitivity at a given relieving capacity. A free diaphragm diameter of 2.9 inches is suitable for demonstration of the present invention.

The diaphragm's physical characteristics affect the relieving performance of the device. A reinforced elastomeric diaphragm, which is pliable to bending but is resistance to planar stretching, promotes higher sensitivities than un-reinforced diaphragms by increasing the effective size of the unsupported area around each vent void. In practice, a reinforced elastomeric diaphragm should be selected that is thin enough to be pliable, yet thick enough to withstand full system pressure stretched across the larger holes. Elastomeric stiffness, in Durometers, is not believed to be a critical factor for thin diaphragms. A 1/32" thick fabric reinforced rubber sheet with a typical or moderate hardness, such as a Shore A durometer in 50–80 range, is particularly suitable for demonstration of the present invention.

The reference pressure source is a fluid source wherein the pressure of the fluid source can be accurately controlled. Particularly preferred fluids include gases. A particularly preferred gas comprises nitrogen with a most preferred fluid being air. Liquids can also be employed but are less desirable.

The separator is preferably a chamber which allows fluids to separate from liquids in a stream. Separators are commonly employed to remove moisture from air streams wherein the air stream originates from a compressed air source. It is not uncommon for moisture to be entrained with the air flow and a separator allows the moisture to separate from the air flow. A separator can also provide a reservoir which acts to absorb, or dampen, rapid changes in pressure without transmitting the rapid pressure change further down the process line. For example, with water flow systems, an air reservoir may be employed to eliminate the phenomenon commonly referred to as "hammering" or "bumping" due to rapid changes in pressure.

The process system is any system commonly employed in manufacturing environments wherein the pressure must be maintained at or below an upper maximum. The present invention is suitable for use with fixed reaction kettles where the pressure in the reaction kettle must be monitored and with flow systems wherein the pressure build of flowing materials must be monitored.

It would be well within the ability of those with ordinary skill in the art to capture the material as it escapes form the vent voids or to redirect the material to a location of minimal concern.

The invention has been described with particular reference to the preferred embodiments which are intended to enable one of ordinary skill in the art to demonstrate the present invention. The preferred embodiments are not intended to limit the scope of the present invention which is set forth in the claims appended hereto.

What is claimed is:

1. A relief valve comprising a diaphragm wherein said diaphragm has a fluid pressure on a first side and a process pressure on a second side and said second side is separately engagable with a continuous process surface comprising a process void and a multiplicity of vent voids such that when said process pressure is below said fluid pressure said diaphragm is engaged with said vent voids and when said process pressure is above said fluid pressure said diaphragm is not engaged with at least one vent void of said vent voids wherein a cross-sectional area of said process void is larger than a sum total cross-sectional area of said vent voids.

2. The relief valve of claim 1 comprising a first vent void and a second vent void wherein said first vent void is larger than said second vent void.

3. A relief valve comprising a diaphragm wherein said diaphragm has a fluid pressure on a first side and a process pressure on a second side and said second side is separately engagable with a process void and at least one vent void such that when said process pressure is below said fluid pressure said diaphragm is engaged with said vent void and when said process pressure is above said fluid pressure said diaphragm is not engaged with said vent void further comprising multiple vent voids further comprising a first vent void and a second vent void wherein said first vent void is larger than said second vent void wherein said first vent void is closer to said process void than said second vent void wherein a cross-sectional area of said process void is larger than a sum total cross-sectional area of said vent voids.

4. A relief valve comprising a diaphragm wherein said diaphragm has a fluid pressure on a first side and a process pressure on a second side and said second side is separately engagable with a process void and at least one vent void such that when said process pressure is below said fluid pressure said diaphragm is engaged with said vent void and when said process pressure is above said fluid pressure said diaphragm is not engaged with said vent void further comprising multiple vent voids wherein each said vent void is the same distance from said process void.

5. The relief valve of claim 1 further comprising a process housing wherein said process housing comprises said process void and said vent void.

6. The relief valve of 3 further comprising a reference housing wherein said diaphragm is between said reference housing and said process housing.

7. The relief valve of claim 6 wherein when said process pressure is higher than said reference pressure said diaphragm is persuaded towards said reference housing.

8. A process control system comprising:
    a process vessel;
    a reference pressure source;
    a control loop between said process vessel and said reference pressure source wherein said control loop comprises a relief valve in accordance with claim 1; and
    a feed back loop between said process vessel and said reference pressure source.

9. A relief valve comprising:
    a process housing comprising a continuous process surface further comprising a process void and multiple vent voids wherein said process void is in pressure communication with a process system, with a process pressure, and said vent voids selectively allow material to flow from said process system through said vent voids;
    a reference housing wherein said reference housing contains a fluid at a predetermined pressure; and
    a diaphragm between said process housing and said reference housing capable of separately engaging with said vent voids and said process voids wherein when said reference pressure is higher than said process pressure said diaphragm is engaged with said vent voids and when said process pressure is higher than said reference pressure said diaphragm is not engaged with said vent voids and said process pressure can decrease through said vent voids; wherein said vent voids are separated by a distance greater than a separation between said reference housing and said process housing and a cross-sectional area of said process void is larger than a sum total cross-sectional area of said vent voids.

10. The relief valve of claim 9 wherein said fluid is a gas.

11. The relief valve of claim 10 wherein said gas comprises nitrogen.

12. The relief valve of claim 9 comprising a first vent void and a second vent void wherein said first vent void is larger than said second vent void.

13. A relief valve comprising:
    a process housing comprising a process void and at least one vent void wherein said process void is in pressure communication with a process system, with a process pressure, and said vent void selectively allows material to flow from said process system through said vent void;
    a reference housing wherein said reference housing contains a fluid at a predetermined pressure; and
    a diaphragm between said process housing and said reference housing capable of separately engaging with said vent void and said process void wherein when said reference pressure is higher than said process pressure said diaphragm is engaged with said vent void and when said process pressure is higher than said reference pressure said diaphragm is not engaged with said vent void and said process pressure can decrease through said vent void further comprising multiple vent voids further comprising a first vent void and a second vent void wherein said first vent void is larger than said second vent void wherein said first vent void is closer to said process void than said second vent void and a cross-sectional area of said process void is larger than a sum total cross-sectional area of said vent voids.

14. A relief valve comprising:
    a process housing comprising a process void and at least one vent void wherein said process void is in pressure communication with a process system, with a process pressure, and said vent void selectively allows material to flow from said process system through said vent void;
    a reference housing wherein said reference housing contains a fluid at a predetermined pressure; and
    a diaphragm between said process housing and said reference housing capable of separately engaging with said vent void and said process void wherein when said reference pressure is higher than said process pressure said diaphragm is engaged with said vent void and when said process pressure is higher than said reference pressure said diaphragm is not engaged with said vent void and said process pressure can decrease through said vent void further comprising multiple vent voids wherein each said vent void is the same distance from said process void and a cross-sectional area of said process void is larger than a sum total cross-sectional area of said vent voids.

15. A process control system comprising:

a process vessel;

a reference pressure source;

a control loop between said process vessel and said reference pressure source wherein said control loop comprises a relief valve in accordance with claim 9; and a feed back loop between said process vessel and said reference pressure source.

16. A process control system comprising:

a process vessel;

a reference pressure source;

a control loop between said process vessel and said reference pressure source wherein said control loop comprises a relief valve comprising:

a diaphragm between a reference housing and a process housing wherein:

said process housing comprises a process void independently engagable with said diaphragm, in pressure communication with a process vessel at a process pressure, and a vent void; and a cross-sectional area of said process void is larger than a sum total cross-sectional area of said vent voids; and said reference housing comprises a fluid at a reference pressure;

wherein when said reference pressure exceeds said process pressure said diaphragm is engaged with said vent void and when said process pressure exceeds said reference pressure said diaphragm is not engaged with said vent void and said process pressure decreases by venting through said vent void; and a feed back loop between said process vessel and said reference pressure source further comprising a check valve in said feed back loop between said process vessel and said reference pressure source further comprising a separator in said feed back loop.

* * * * *